United States Patent [19]

Adamson

[11] Patent Number: 4,802,798
[45] Date of Patent: Feb. 7, 1989

[54] DRILL HEAD

[76] Inventor: Thomas Adamson, 1619 N. Home, Mishawaka, Ind. 46545

[21] Appl. No.: 132,259

[22] Filed: Dec. 14, 1987

[51] Int. Cl.⁴ .............................................. B23B 45/14
[52] U.S. Cl. .................................. 408/112; 408/202; 408/241 S
[58] Field of Search ................... 408/14, 16, 110, 111, 408/112, 241 B, 241 G, 241 S, 241 R, 202; 409/218; 229/15

[56] References Cited

U.S. PATENT DOCUMENTS 2,868,044  1/1959  Chaffee et al. ..................... 408/110
3,241,405  3/1966  Davis ................................. 408/110

Primary Examiner—Z. R. Bilinsky
Attorney, Agent, or Firm—James D. Hall

[57] ABSTRACT

A drill head which enhances the accuracy of a drill, is attachable thereto and which includes an inner cylinder which is retractable into an outer cylinder and means to adjust such retractable distance, which distance is determinative of the exact depth of the hole to be drilled.

5 Claims, 2 Drawing Sheets

U.S. Patent  Feb. 7, 1989  Sheet 1 of 2  4,802,798
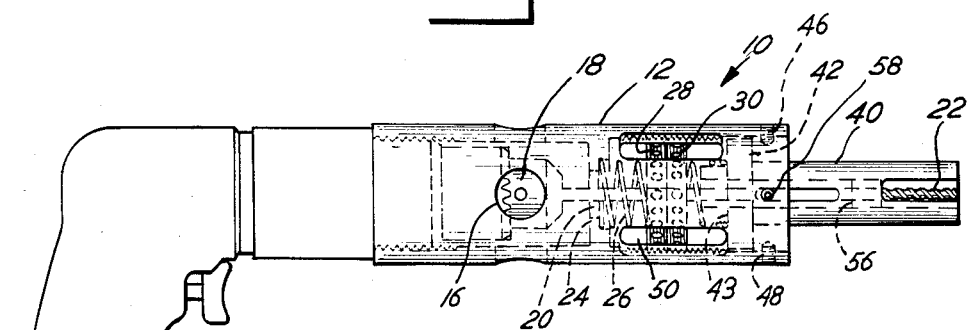
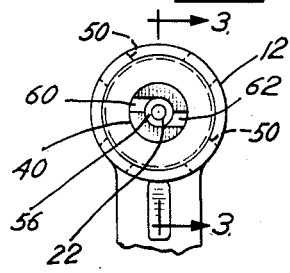
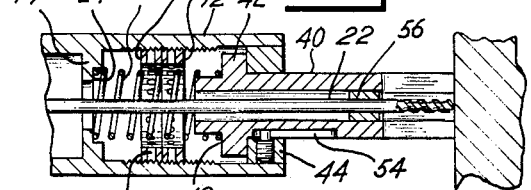
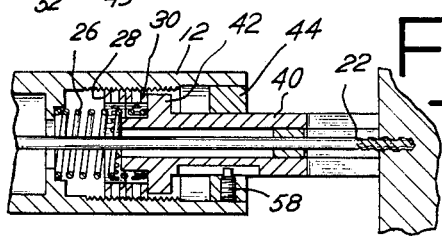
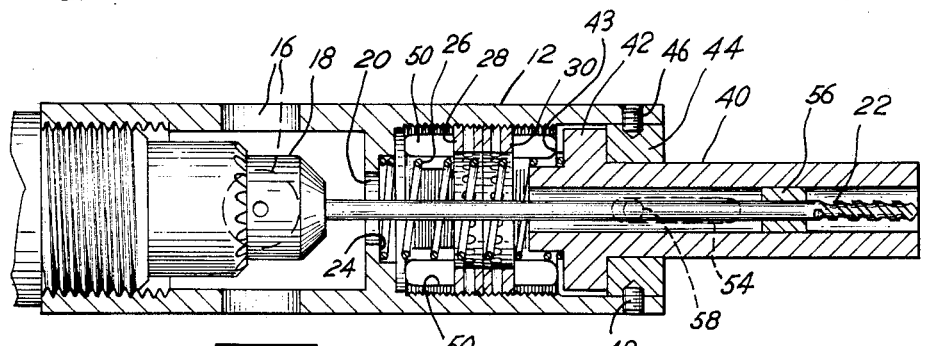

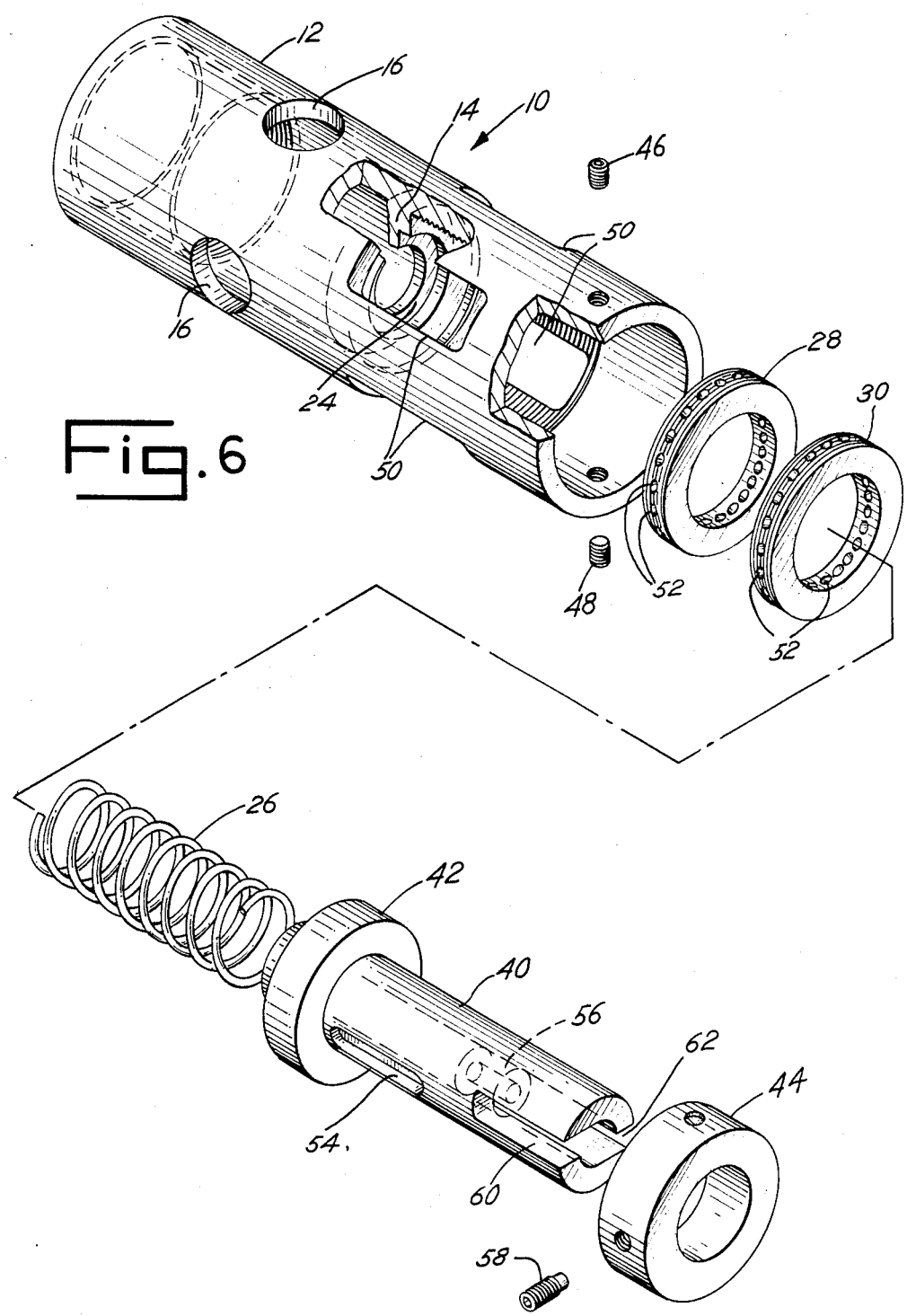

4,802,798

DRILL HEAD

BACKGROUND OF THE INVENTION

This invention is directed to a head or barrel for a drill which allows for drilling holes in a workpiece with a high degree of accuracy and is particularly adaptable to industrial drills.

The drilling of a hole to a desired depth in a workpiece has always presented a problem. Many solutions have been presented, including the fixing of a small ring or collar to the drill bit. For general work, this solution has been relatively satisfactory, but has certain drawbacks. An individual using the drill may set the collar at a desired position by use of a scale, but this does not permit a high degree of accuracy. Further, the collar rotates with the drill bit, so that, when the depth is reached and the collar impinges upon the workpiece, a scoring or marring of the finish results.

Another solution involves the provision in a drill head similar to that of the present invention of a multiplicity of internal barrels of different lengths. The surface against which the barrel abuts is fixed and the lengths of the barrels correspond to the depths to which the holes are to be drilled. This provides accuracy which is superior to that obtained by other drills, but requires disassembly of the drill head and the replacement of the drill bit and the barrel each time a hole of a different depth is to be drilled.

The present invention provides a means for overcoming the prior art disadvantages which incorporates an adjustable abutment means which permits the drilling of holes of a variety of depths to a degree of accuracy heretofore unobtainable with a hand-held drill.

SUMMARY OF THE INVENTION

The purpose of this invention is to convert an ordinary heavy-duty drill to a precision instrument capable of drilling blind holes to a depth within an accuracy of 0.001". This is achieved by providing a drill head which is readily adaptable to any industrial drill.

The drill head is attached to the drill and is designed so that access may be had to the drill chuck in order that drill bits may be inserted or removed without disassembling the drill head from the drill. Further, access is provided to a pair of lock nuts or rings for adjusting the depth to which the holes are to be drilled without disassembling the drill head from the drill.

The depth determining internal barrel portion of the drill head is urged forward against an internal ring which determines the starting point for drilling. As the drill bit enters the workpiece, the internal barrel withdraws, against the pressure of the spring, further into the drill head until it abuts the lock nut.

The lock nut has been pre-set to permit the internal barrel to withdraw to the extent desired. As a result, the drill bit has entered the workpiece to the exact distance that the barrel has withdrawn.

BRIEF DESCRIPTION OF THE DRAWINGS

FIG. 1 is a diagrammatic view of the apparatus assembled on an industrial drill.

FIG. 2 is a frontal view of the apparatus shown in FIG. 1.

FIG. 3 is a sectional view of the apparatus taken along lines 3—3 of FIG. 2.

FIG. 4 is a fragmentary sectional view of the apparatus impinged against a workpiece prior to drilling.

FIG. 5 is a fragmentary sectional view of the apparatus wherein the inner barrel is retracted its full extent.

FIG. 6 is an exploded perspective view of the apparatus and its component parts.

DESCRIPTION OF THE PREFERRED EMBODIMENT

FIG. 1 is a diagrammatic illustration of the drill head of this invention. The drill head is illustrated as mounted on and fixed to an industrial drill which happens to be pneumatically actuated. The drill itself does not form a part of this invention and is not to be so limited, as the drill may be of any type normally used in this nature of operation.

The drill head consists of an elongated cylindrical barrel 12 preferably machined from aluminum or a similar metal, having an inside diameter approximating the general diameter of the drill to which it is attached. The interior diameter is constant, with the exception of an internal collar portion 14 which serves as an abutment (to be fully explained later) located approximately at its midpoint.

One end of the barrel is threaded and it is at this point that the barrel is mated to the drill. Openings 16 are provided in the barrel to facilitate access to the drill chuck 18.

Internal collar portion or abutment 14 of barrel 12 has a centrally located bore 20 through which drill bit 2 passes. On the forward edge of abutment 14 there is a lip 24 which serves as a seat for spring member 26.

Immediately forward of the abutment, the interior surface of the barrel is threaded a distance extending approximately one half the distance from interior abutment 14 to the front end of barrel 12. This threaded portion accommodates two lock rings 28, 30, which are accordingly movable the length of the threaded portion.

Forward of the threaded portion, barrel 12 has a clean interior face, the diameter of which is slightly greater than the diameter of lock rings 28, 30.

A second barrel 40 is insertable into elongated barrel 12. Barrel 40 has a diameter somewhat less than the interior diameter of barrel 12 and a bore through which the drill bit extends. Spaced slightly forward of the rearmost end of barrel 40 is a circumferential shoulder 42, the distance from the end being sufficient to form a seat 43 for spring 26. Accordingly, seat 43 of the barrel has a diameter equal to or closely approximating the diameter of seat 24 of abutment 14.

Tightly insertable at the forward end of barrel 40 is a collar 44 which is secured by one or more set screws 46, 48. When inserted into barrel 12, collar 44 snugly but slidably fits the diameter of the forward portion of barrel 12. Collar 44 is secured to barrel 12 by insertion of set screws 46, 48. The pressure of spring 26, with its inner end engaging seat 24 in abutment 14 and its opposite end engaging the end of circumferential shoulder 42, urges barrel 40 outwardly to a position in which shoulder 42 engages collar 44, as shown in FIG. 4.

In that portion of barrel 12 which is threaded to receive lock rings 28, 30, there are slots 50 through the barrel extending in a longitudinal direction the same distance as that portion which is threaded. Four such slots are shown in FIG. 6, but there may be a lesser number without departing from the scope of the invention. Each of the lock rings 28, 30, has a number of holes 52 drilled inwardly around its circumference. Slots 50 provide access to the rings and to the holes. It will be understood that the critical factor is that access to lock rings 28, 30 is provided that as few as one slot may be permitted. The rings are rotated by use of a pin (not shown) which is inserted into a given hole and manually turned. Such rings and pins are standard articles of manufacture and are not unique to this apparatus.

Barrel 40 is provided with a single follower groove 54 which extends from approximately the foremost edge of circumferential collar 44 forwardly a distance equal to the movement permitted by the abutments of the barrel.

To enhance the accuracy of the drill head, barrel 40 includes a bushing 56 in the bore. The interior diameter of the bushing closely approximates the diameter of drill bit 22. This prevents the bit from "wobbling".

Collar 44 is provided with a third threaded hole to accommodate retriever screw 58. Retriever screw 58 is of a length sufficient to extend inwardly beyond collar 44 and into follower groove 54. The primary purpose of retriever screw 58 in combination with follower groove 54 is to prevent rotation of barrel 40.

Forward of bushing 56 are two slots 60, 62 which are slightly offset, as best illustrated in FIGS. 2 and 6. Slots 60 and 62 extend to the forward end of barrel 40 and serve to break chips from the workpiece.

It will be seen from the figures that a large portion of barrel 40 extends beyond the end of barrel 12. When inserted into drill chuck 18, the tip of drill bit 22 preferably is flush with the end of barrel 40, but it may be 0.001" or 0.002" behind.

The operator of the drill turns lock ring 28 in a direction which causes it to move rearwardly (toward the drill). He then sets lock ring 30 to the exact depth that he wishes to be drilled in the workpiece. Next, he returns lock ring 28 in the forward direction until it tightly abuts lock ring 30, thereby performing the function of securing the rings in their desired position.

The operator then presses the drill head to the workpiece and applies pressure. The manual pressure overcomes the pressure exerted by spring 26 and barrel 40 is retracted into barrel 12.

Quite obviously, during this time, drill bit 22 enters the workpiece. When collar 42 abuts lock ring 30, the desired depth has been reached and the drill bit cannot penetrate further into the workpiece.

The drill head will accommodate the full range of drill bits that will be accepted by the drill. Due to access to the chuck, drill bits of the same size may be interchanged without the necessity of having to remove the drill head from the drill. If a change in the size of the drill bit is desired, the replacement of the inner barrel, containing a bushing matching the diameter of the drill bit, is readily accomplished by removal of the set screws, again without the need to remove the drill head from the drill.

The depth of the insertion is not limited, in that the barrels may be of a variety of lengths and sizes.

It is to be understood that the above description does not limit the scope of the invention to those details, but may be modified within the scope of the appended claims.

What is claimed is:

1. A drill head for use with a drill including means for securing said drill head to said drill, said drill head comprising
   an elongated cylindrical outer barrel of a diameter sufficient to surround the front portion of said drill,
   said outer barrel having a first abutment means intermediate its length,
   an inner barrel supported for longitudinal movement within said outer barrel,
   said abutment means at the foremost end of said outer barrel,
   spring means extending between said first abutment means and said inner barrel to urge said inner barrel into engagement with said second abutment means, and a pair of lock rings threadably mounted to the inner wall of said outer barrel and adjustable to form a stop which determines the extent of longitudinal movement of said inner barrel into said outer barrel.

2. The drill head of claim 1 wherein said longitudinal movement of said inner barrel into said outer barrel determines the depth of penetration of a drill bit into a workpiece.

3. The drill head of claim 1 wherein said outer barrel has one or more openings therein located so as to permit access by a chuck key to the chuck of said drill, whereby insertion and removal of a drill bit is achieved without the need to remove said drill head from said drill.

4. The drill head of claim 1 wherein said outer barrel has one or more openings therein located along its longitudinal axis to permit access to said lock rings for adjustment thereof to determine the extent of longitudinal movement of said inner barrel into said outer barrel.

5. The drill head of claim 1 including means to prevent said inner barrel from rotating when said drill is in an operating condition, said means comprising a screw which extends from the outer periphery of said outer barrel into a slot in said inner barrel extending along a portion of the longitudinal axis thereof.

* * * * *